E. GRUENFELDT.
MOTOR VEHICLE CONSTRUCTION.
APPLICATION FILED MAY 18, 1914.
1,110,134.
Patented Sept. 8, 1914.
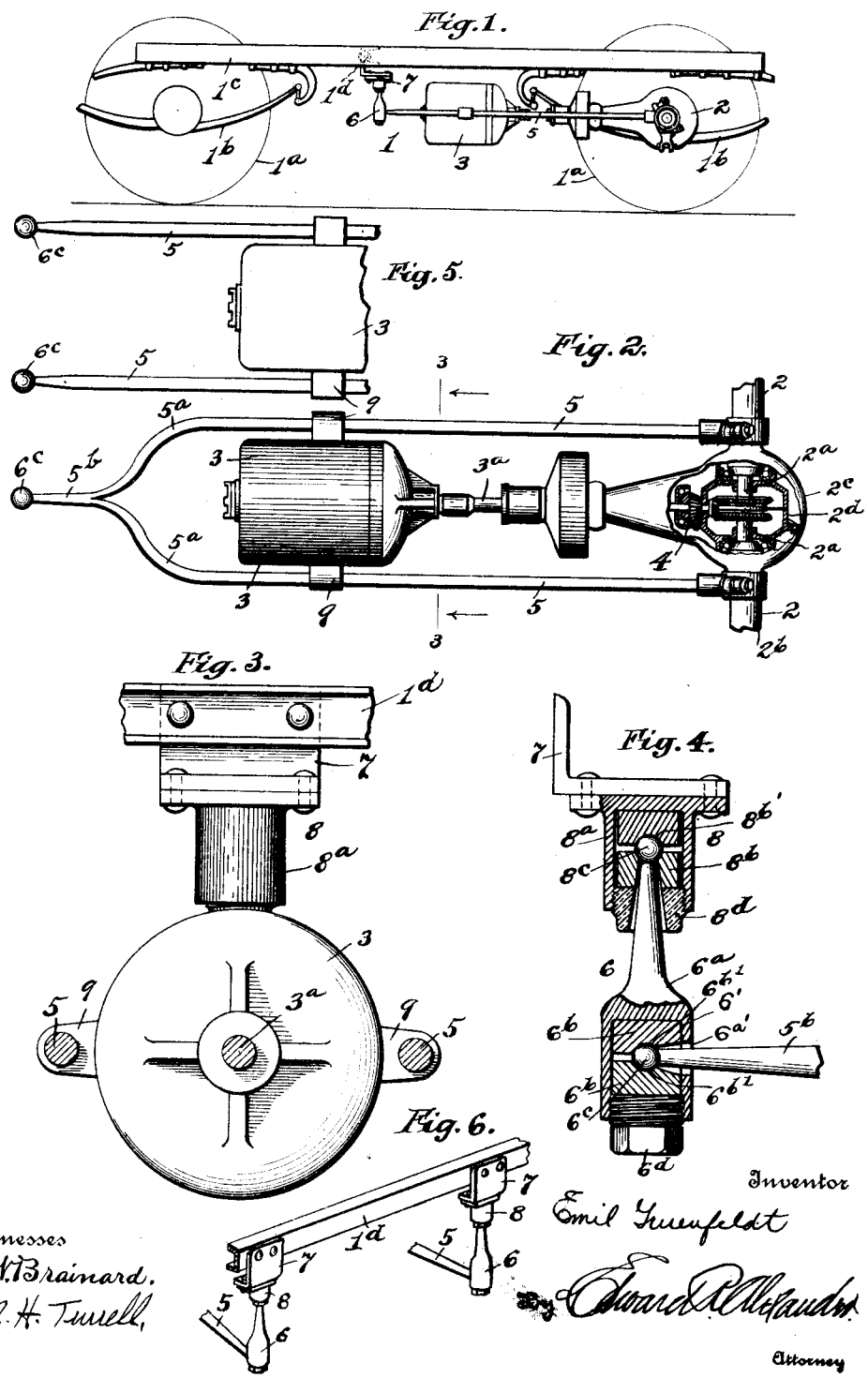

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

MOTOR-VEHICLE CONSTRUCTION.

1,110,134. Specification of Letters Patent. Patented Sept. 8, 1914.

Original application filed December 21, 1910, Serial No. 598,540. Divided and this application filed May 18, 1914. Serial No. 839,234.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Motor-Vehicle Construction, of which the following is a specification.

My invention relates to motor vehicle construction and more particularly to the arrangement and mounting of an electric motor and drive or propeller shaft mechanism relative to a rear axle having live driven shaft sections.

This application is a division of my application for Letters Patent filed Dec. 21, 1910, Serial Number 598,540.

For the purpose of illustration, I have in the accompanying drawings, shown and herein described, one form of motor vehicle construction embodying my invention.

Figure 1 is a side view of the chassis of a motor vehicle showing my invention applied thereto. Fig. 2 is a top plan view of certain parts of the chassis shown in Fig. 1 somewhat enlarged. Fig. 3 is a transverse sectional view on the line 3—3 of Fig. 2. Fig. 4 is a fragmentary view, partly in section of the support for the front end of the reach rods. Figs. 5 and 6 are fragmentary views showing a different form of the invention.

In the drawings, 1 indicates the chassis of a vehicle; 1ª indicates the wheels therefor; and 1ᵇ indicates the springs on which the frame 1ᶜ is mounted; 1ᵈ indicates a cross member connecting the sides of the frame 1ᶜ together. These parts may be of any usual form; 2ᵇ, 2ᵇ, a differential housing 2ᶜ and a differential 2ᵈ themselves form no part of my invention.

2 indicates the rear axle comprising live axle sections 2ª, 2ª, housings or casings therefor 2ᵇ, 2ᵇ, a differential housing 2ᶜ and a differential 2ᵈ.

3 indicates an electric motor.

3ª indicates a drive or propeller shaft, which is driven by the motor 3. This shaft is connected at one end to the armature shaft of the motor and at its opposite end to the gear 4, which latter drives the live axle sections 2ª, 2ª, through the differential 2ᵈ.

5, 5, indicate a pair of spaced arms or rods, each connected at its rear end to the housing of the rear axle 2 and extending forwardly therefrom upon opposite sides of the motor 3 and beyond its front end. As indicated at 5ª, the rods 5 are preferably curved inwardly or toward each other at a point in front of the motor and their free ends are arranged side by side. The free ends of the rods 5 may be secured together in any well known manner to form a single rod 5ᵇ, which extends forward of the motor and preferably in line with the axis of the armature shaft therefor.

6 indicates a universal joint between the frame 1ᶜ and the front end of the rod 5ᵇ, forming a support for the latter. The joint 6 preferably comprises a member 6ª, supported by the frame 1ᶜ and having a chamber 6′; a pair of blocks 6ᵇ mounted within the chamber 6′; and a ball 6ᶜ which is carried by the free end of the rod 5ᵇ.

As shown in the drawings, the blocks 6ᵇ are recessed at 6ᵇ′ and thus coöperate to form a socket between them to rotatably receive the ball 6ᶜ. The blocks 6ᵇ are preferably held in the chambered portion 6′ of the member 6ª by a screw plug 6ᵈ. The rear wall of the chamber 6′ is formed with an opening 6ª′ through which the rod 5ᵇ extends. As shown, the member or hanger 6ª depends from the frame 1ᶜ.

The universal joint member 6ª is connected to the frame 1ᶜ at its upper end, preferably by a universal joint 8. This joint 8 may comprise a casing 8ª, connected in any suitable manner with the frame 1ᶜ; a pair of blocks 8ᵇ between which is formed a socket 8ᵇ′, and a ball element 8ᶜ rotatably fitting within the socket.

As will be understood from the drawings, the ball element 8ᶜ is carried by the upper end of the member 6ª, it being preferably formed integrally therewith. The blocks 8ᵇ are arranged in the casing 8ª; they are preferably held therein by a screw plug 8ᵈ.

The plug 8ᵈ and the adjacent block 8ᵇ are formed with suitable openings through which the member 6ª extends, these openings being large enough to permit movements of the member 6ª about the axis of the ball and socket joint 8, incident to the operation of the vehicle.

7 indicates a bracket member which may be interposed between the frame 1ᶜ and casing 8ᵃ. This member 7 preferably comprises an angle bar, the upright part of which is fixed to the cross member 1ᵈ of the frame 1ᶜ and the foot part of which has fixed to it the casing 8ᵃ.

9, 9, indicate devices for supporting the motor 3 on and rigidly connecting it to the arms 5. These devices project from opposite sides of the motor or motor casing and are preferably formed with openings through which the arms 5 extend.

In Figs. 5 and 6 I have illustrated a slightly different form of the invention. As will be understood from these figures, instead of curving the reach rods 5 inwardly, and connecting them together at a point forward of the motor 3, they are continued forward parallel to each other and each is supported by a universal joint 6 similarly to joint 6 which supports the rod 5ᵇ; and the socket member of the joint is in turn connected to the frame 1ᶜ by a universal joint 8.

To those skilled in the art of making apparatus of the class described, many alterations in construction and widely differing embodiments and applications of my invention will suggest themselves, without departing from the spirit and scope thereof.

My disclosures and the description herein are purely illustrative, and are not intended to be in any sense limiting.

It will be noted that the motor, rear axle and the drive connections or power transmitting mechanism between the armature shaft of the motor and the live shaft sections of the rear axle are so supported, correlated and connected together that no relative movement of these parts in directions to cause disalinement of the armature shaft, propeller shaft and rear axle mechanism can be effected due to any normal conditions met with in the operation of the motor or road conditions to which the rear drive wheels of the vehicle may be subjected. In this connection it may be stated that my present invention is an improvement upon my invention as disclosed in Letters Patent of the United States No. 941,517, dated November 30, 1909, inasmuch as I have herein provided against any possibility of relative detrimental movement of the motor and the combined torsion and reach rods which support the motor. Through the instrumentality of these rods and the rear axle and motor housings the motor shaft, drive or propeller shaft and the shaft connections between the latter and the differential mechanism of the rear axle are held in rigid alinement with each other, irrespective of the movements of either the motor or the rear axle relative to the frame of the vehicle.

In other words, the motor, the drive connections between the motor and the rear axle, the arms, and rear axle housing when they move together must always move as a unitary structure.

It will be further noticed that the support between the frame and the motor casing is effected through a plurality of universal joints, one or more of which is preferably in the horizontal plane of the axis of the armature shaft, while the other or others of the universal joints are thereabove.

What I claim is:

1. In an electric motor vehicle, the combination with a vehicle frame, a wheeled support for the front end of said frame, and a wheeled support for the rear end of said frame including a rear axle having a housing with live axle sections and differential mechanism incased thereby, of a ball and socket universal joint supported by said frame, an electric motor arranged entirely between said ball and socket joint and said differential mechanism and having its armature shaft disposed longitudinally of said frame, the said universal joint being arranged in alinement with the armature shaft of said motor and supporting the motor from its front end, gearing connections between the rear end of said armature shaft and said differential mechanism, and a rigid support between the motor casing and said rear axle housing whereby the motor casing and axle housing always move together as a unitary structure.

2. In an electric motor vehicle, the combination with a vehicle frame and a rear axle for supporting the same at its rear end, said rear axle having a housing with live axle sections and differential mechanism incased thereby, of an electric motor rigidly connected to and supported at its rear end by said housing and having its armature shaft disposed longitudinally of the frame, gearing connections between the rear end of said armature shaft and said differential mechanism, and a universal joint supporting the motor at its front end, one element of said joint being connected with the motor and arranged in alinement with the armature shaft of the motor and entirely in front thereof, and the other element of said joint being connected to said frame.

3. In an electric motor vehicle, the combination with a rear axle mechanism including a housing with live axle sections and differential mechanism incased thereby, and a vehicle frame yieldingly supported upon said housing, of a universal joint suspended from said frame to move relatively thereto and arranged in the vertical longitudinal plane of said differential mechanism, an electric motor arranged entirely between said universal joint and said rear axle mechanism, said motor being upported at its front end by said universal joint, and having the axis of its armature shaft extending through said universal joint, a driving connection between the rear end of said armature shaft and said differential mechanism, and a rigid connection between said motor and said rear axle housing, whereby the motor casing and axle housing always move together as a unitary structure.

4. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism, means connecting the motor casing and axle housing together so that they will swing together up and down and laterally relatively to said frame as a unitary structure, a ball and socket universal joint disposed co-axially with the armature shaft of said motor and entirely at one end of said motor, the said ball being connected to move with said motor casing about the axis of said armature shaft, and means connecting said socket and said frame.

5. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism, means connecting the motor casing and axle housing together so that they will move together longitudinally and laterally of said frame as a unitary structure, a ball and socket universal joint disposed co-axially with the armature shaft of said motor and entirely at one end of said motor, the said ball being connected to move with said motor casing about the axis of said armature shaft, and means swingably connecting said socket to said frame.

6. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the rear end of said motor casing to said axle housing, whereby said motor is partially supported by said rear axle and will move therewith as a unitary structure, and means connecting said motor to said frame and supporting it therefrom while permitting said motor and rear axle as a unitary structure to move to and fro longitudinally of the frame, said means including a universal joint disposed co-axially with the armature shaft of said motor and entirely at one end of said motor.

7. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the rear end of said motor casing to said axle housing, whereby said motor is partially supported by said rear axle and will move therewith as a unitary structure, and means connecting said motor to said frame and supporting it therefrom while permitting said motor and rear axle as a unitary structure to move to and fro longitudinally of the frame, said means including a universal joint having its elements disposed in the plane of the axes of said armature shaft and live axle sections and adapted through their connection with said frame to counteract torsional impulses on said rear axle housing.

8. In an electric motor vehicle, the combination of a shaft drive axle having a housing with live axle sections and a differential mechanism incased thereby, an electric motor having its armature shaft disposed at right angles to said live axle sections, gearing connections between said armature shaft and said differential mechanism including a propeller shaft, means rigidly connecting the motor casing and axle housing together whereby they will always move together as a unitary structure including about the axis of said armature shaft, a ball carried by said connecting means co-axially with the armature shaft of said motor, a vehicle frame, resilient supports between said frame and said rear axle housing, and a socket for said ball supported from said frame.

9. In an electric motor vehicle, the combination of a shaft drive axle having a housing with live axle sections and a differential mechanism incased thereby, an electric motor having its armature shaft disposed at right angles to said live axle sections, gearing connections between said armature shaft and said differential mechanism including a propeller shaft, means rigidly connecting the motor casing and axle housing together whereby they will always move together as a unitary structure including about the axis of said armature shaft, a ball carried by said connecting means co-axially with the armature shaft of said motor, a vehicle frame, resilient supports between said frame and said rear axle housing, and a socket for said ball swingably supported from said frame.

10. In an electric motor vehicle, the combination of a vehicle frame, a wheeled support for the rear end of said frame, including a shaft drive axle having a housing with live axle sections and a differential mechanism incased thereby, a universal joint, an electric motor having its armature shaft disposed longitudinally of the frame and geared to said differential mechanism, means for supporting the rear end of said motor from said rear axle housing, the front end of said motor being connected to said universal joint, and a second universal joint between one member of the first mentioned universal joint and said frame.

11. In an elevator motor vehicle, the combination of a vehicle frame, front and rear wheeled supports therefor, including a shaft drive axle having a housing with live axle sections and a differential mechanism incased thereby, a depending member, a universal joint at the upper end of said depending member and connecting it to said frame, a second universal joint at the lower end of said depending member, and an electric motor arranged between said second universal joint and said differential mechanism and having its armature shaft disposed longitudinally of the frame and geared at its rear end to said differential mechanism, the rear end of said motor being supported from said rear axle housing and the front end of said motor being supported by said second universal joint.

12. In an electric motor vehicle, the combination of a vehicle frame, a wheeled support for the front end of said frame, a wheeled support for the rear end of said frame including a shaft drive axle having a housing with live axle sections and a differential mechanism incased thereby, an electric motor having its armature shaft disposed longitudinally of the frame and geared at its rear end to said differential mechanism, means connecting the rear end of said motor to said rear axle housing, whereby said motor and rear axle casing will swing together as a unitary structure relatively to said frame, and a support between said motor and frame including a plurality of universal joints.

13. In an electric motor vehicle, the combination of a vehicle frame, a wheeled support for the front end of said frame, a wheeled support for the rear end of said frame including a shaft drive axle having a housing with live axle sections and a differential mechanism incased thereby, an electric motor having its armature shaft disposed longitudinally of the frame and geared at its rear end to said differential mechanism, means connecting the rear end of said motor to said axle housing whereby said motor and axle housing will swing together as a unitary structure relatively to said frame, and a support for the motor including a hanger and a flexible joint between the lower end of said hanger and said motor, the elements of said joint being in the horizontal plane of the axis of said armature shaft, and a universal joint between the other end of said hanger and said frame.

14. In an electric motor vehicle, the combination of a vehicle frame, a wheeled support for the front end of said frame, a wheeled support for the rear end of said frame including a shaft drive axle having a housing with live axle sections and differential mechanism incased thereby, an electric motor having its armature shaft disposed longitudinally of the frame and geared at its rear end to said differential mechanism, means connecting the rear end of said motor to said rear axle casing, whereby said motor and rear axle casing will swing together as a unitary structure relatively to said frame, and a support for the motor including a hanger, a universal joint in the horizontal plane of the axis of said armature shaft and connecting said motor casing with the lower end of said hanger, and a pivotal connection between the upper end of the hanger and the frame.

In testimony whereof I affix my signature, in the presence of two witnesses.

EMIL GRUENFELDT.

Witnesses:
R. H. JAMISON,
EDWARD R. ALEXANDER.